No. 734,854. PATENTED JULY 28, 1903.
L. G. HAASE.
CEMENT MOLDING APPARATUS.
APPLICATION FILED JAN. 24, 1903.
NO MODEL. 3 SHEETS—SHEET 1.
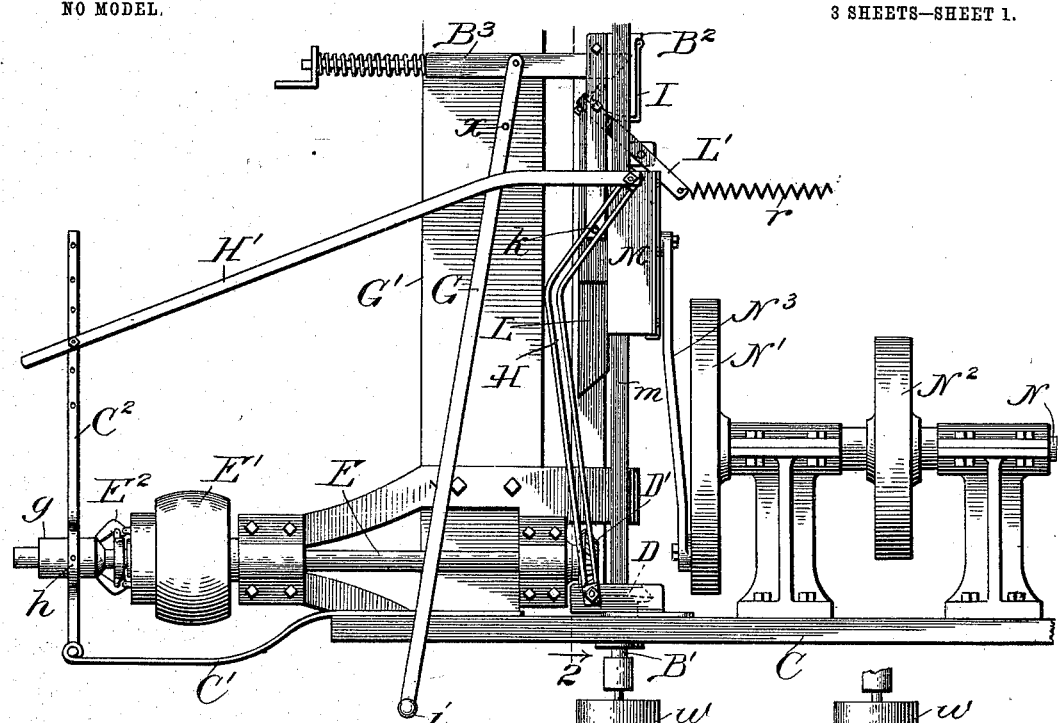
Fig. 1. Fig. 1a.
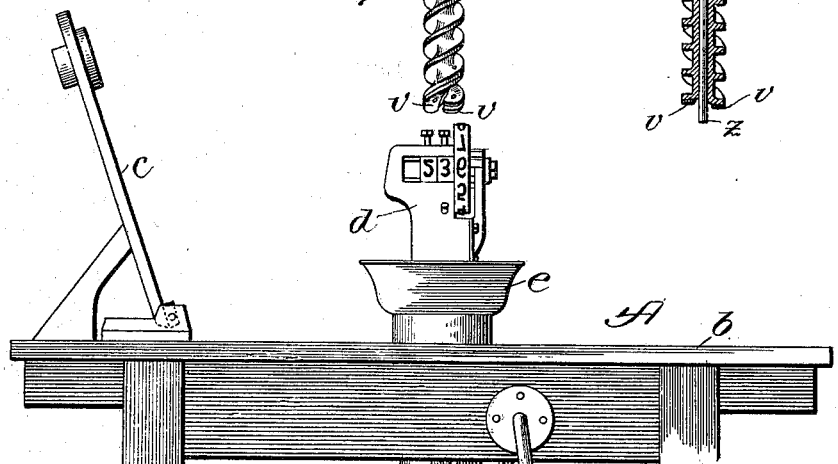
Witnesses:
Chas. C. Gaylord
John Enders, Jr.
Inventor:
Leo G. Haase,
By Dyrenforth, Dyrenforth & Lee,
Att'ys.

No. 734,854. PATENTED JULY 28, 1903.
L. G. HAASE.
CEMENT MOLDING APPARATUS.
APPLICATION FILED JAN. 24, 1903.
NO MODEL. 3 SHEETS—SHEET 2.
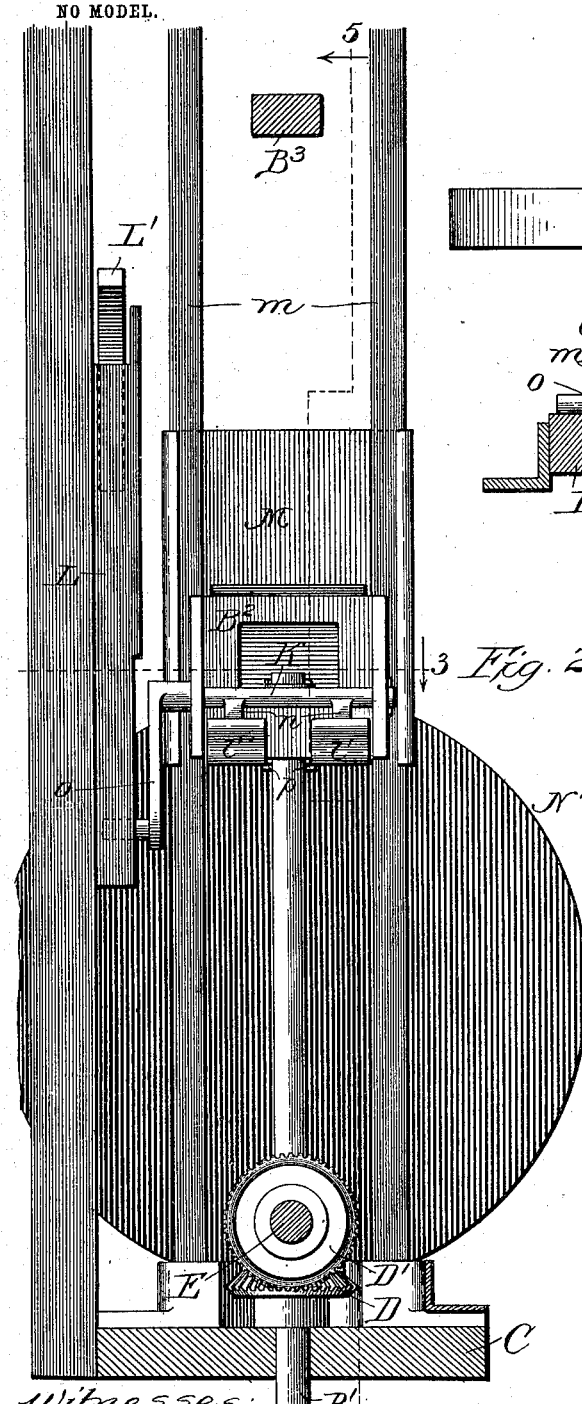
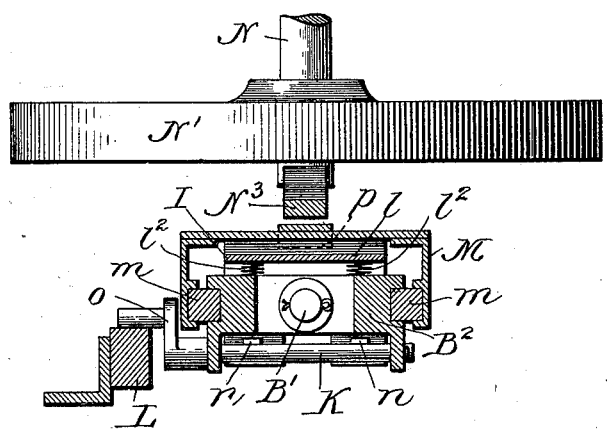
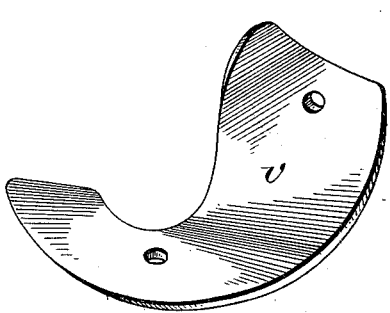
Witnesses:
Inventor:
Leo G. Haase, No. 734,854. PATENTED JULY 28, 1903.
L. G. HAASE.
CEMENT MOLDING APPARATUS.
APPLICATION FILED JAN. 24, 1903.
NO MODEL. 3 SHEETS—SHEET 3.
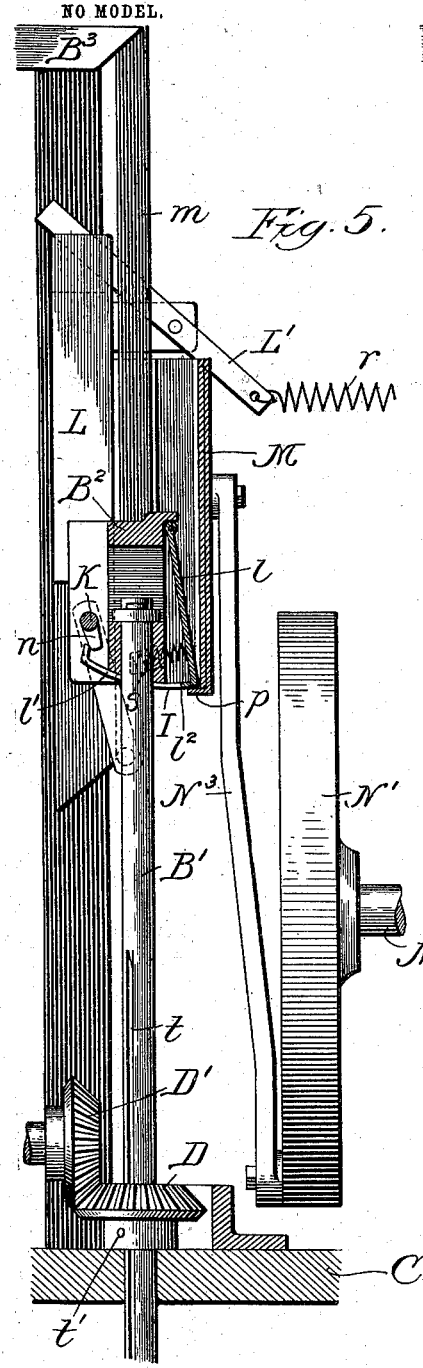
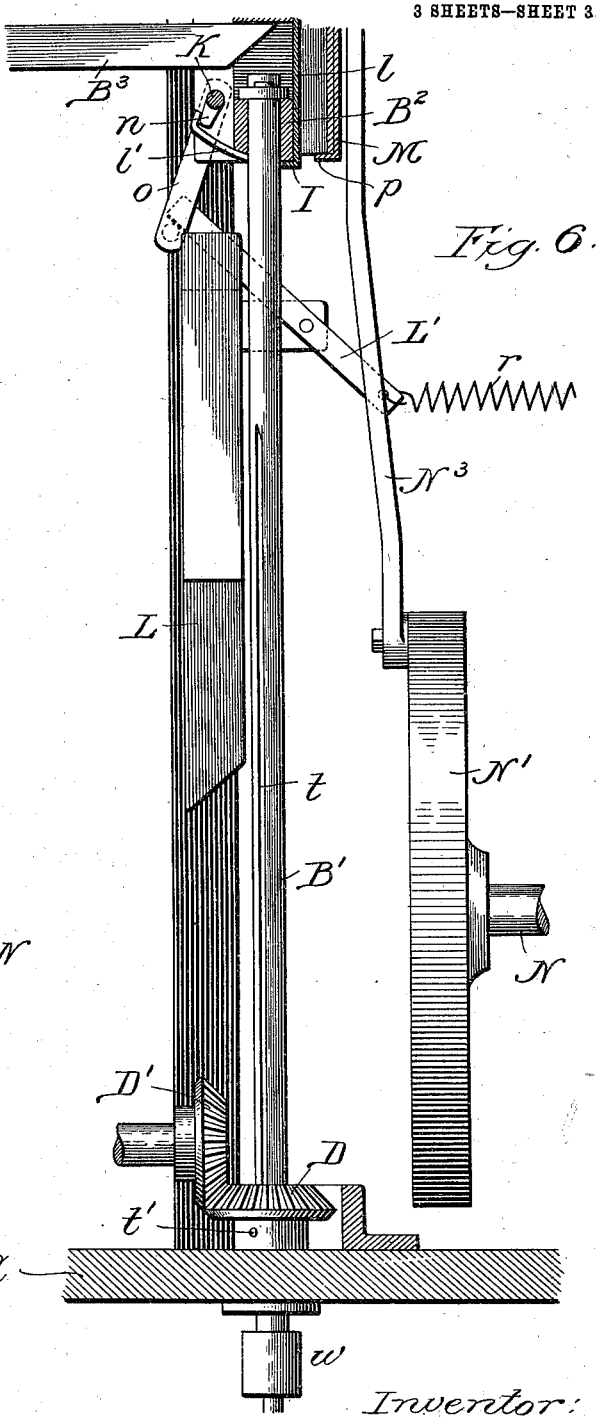
Witnesses:
Chas. E. Gaylord.
John Enders Jr.
Inventor:
Leo G. Haase,
By Dyrenforth, Dyrenforth & Lee,
Att'ys.
THE NORRIS PETERS CO., PHOTO-LITHO., WASHINGTON, D. C.

No. 734,854.

Patented July 28, 1903.

UNITED STATES PATENT OFFICE.

LEO G. HAASE, OF OAKPARK, ILLINOIS.

CEMENT-MOLDING APPARATUS.

SPECIFICATION forming part of Letters Patent No. 734,854, dated July 28, 1903.

Application filed January 24, 1903. Serial No. 140,388. (No model.)

*To all whom it may concern:*

Be it known that I, LEO G. HAASE, a citizen of the United States, residing at Oakpark, in the county of Cook and State of Illinois, have invented a new and useful Improvement in Cement-Molding Apparatus, of which the following is a specification.

My invention relates to an improvement in apparatus for compressing into a mold cement (particularly the mixture of Portland cement and sand known as "concrete") dampened to render it more or less plastic.

While the use of my invention is not limited to the molding of any particular article, I have especially devised it for use in molding such articles as cement posts, tile, pipe, and the like and have employed it in coöperation with the molding-machine which forms the subject of my United States Patent No. 680,432, dated August 13, 1901, though its use is not intended to be confined to that particular concrete-molding machine. The common method of forming these concrete articles by the molding process is, generally stated, to compact the dampened concrete in a mold by tamping it therein with a suitable hand implement while feeding the material into the mold a little at a time. This manner of procedure is not only expensive, because of the time and labor which it consumes, but it fails to produce desired uniformity in the compactness of the article being molded. I overcome these objections by a method of compacting the concrete in a mold which involves compressing it therein in spirally-fed layers with a reversely-rotating spiral tool, by which the material to be molded is thoroughly worked in the mold and compressed by the weight upon the material of the tool, which is lifted gradually out of the mold by the accumulating material therein being molded under the gravity-compression action of the reversely-rotating spiral tool.

My present invention consists in the general as well as the more particular construction of apparatus for practicing the method thus outlined, such apparatus being illustrated in the accompanying drawings, in which—

Figure 1 is a view in side elevation of a machine for molding cement articles provided with my improvements; Fig. 1ª, a view in vertical sectional elevation of the spiral compacting-tool, showing a modified construction thereof; Fig. 2, a section taken at the line 2 on Fig. 1 viewed in the direction of the arrow and enlarged, but omitting the slotted lever and its connections and showing the parts in the relative positions occupied by them as represented in Fig. 5; Fig. 3, a section taken at the line 3 on Fig. 2 and viewed in the direction of the arrow; Fig. 4, an enlarged perspective view of a detail; Fig. 5, a section taken at the line 5 on Fig. 2 and viewed in the direction of the arrow, showing the abutment and catch in the relative positions they occupy when the spiral tool is about to be elevated to its initial position after having completed its compacting work in the mold; and Fig. 6, a view like that presented by Fig. 5, but showing the parts in the relative positions they occupy when the spiral tool has been elevated to its initial position.

A denotes the molding-machine proper, that shown being the one which forms the subject of my aforesaid patent, and therefore requires no detailed description in the present connection. The mold *a* on a table *b*, carrying a headed tamping-lever *c* and a hinged marking-arm *d*, is surmounted by a removable hopper or pan *e* and contains a plunger *f*, the upper end of which forms the bottom of the cylindrical mold and is adapted to be raised therein by working the crank *f'* to lift out of the mold at its top the completed article (cement post) formed therein.

Directly above the mold, in vertical alinement therewith, is rotatably supported the spiral compressing or compacting tool B, which resembles in form an auger, but is blunt at its end, at which the spiral sections *v* are removably fastened in place, as by riveting, to adapt them to be replaced, when worn out, by new ones. These sections are formed of highly-tempered steel for durability and project slightly beyond the edges of the spiral, as shown in Fig. 1. The tool B, which should be weighted, as shown at *w*, is carried on the lower end of a rotary vertical shaft B', journaled near its lower end in an overhead-supported bed C, provided at one end with an extension C', having hinged to its extremity the lower end of an upright bearing C² for the purposes hereinafter described. At its upper end the shaft B' is journaled in a head B², normally supported in its elevated position by a spring-pressed trigger or bolt B³, supported to reciprocate in suitable bearings and adapted to enter at its beveled extremity an opening in the shaft-head B². A lever G is fulcrumed at $x$ to a depending post G', carrying the bed C, and is pivoted at its upper end to the trigger, being provided at its lower end with a handle $i$. The shaft B' is provided with a groove $t$ and passes loosely through a beveled gear D above the bed C, having a pin $t'$ entering the groove in the shaft for guidance, and this gear meshes with a similar gear D' on a horizontal rotary shaft E, journaled in suitable bearings, as shown, and carrying loosely near its outer end a belt-pulley E', equipped with a clutch E², that represented being of common construction, the shipping member $g$ of which loosely surrounds the shaft where it passes through the upright hinged bearing C² at an eye $h$ therein, to which the movable clutch member is pivoted.

H is a bent lever slotted longitudinally to render it of the nature of a cam and fulcrumed at its lower end adjacent to the bed C, being connected at its upper free end by a link H' with the bearing C² at any one of several points provided thereon for purposes of adjustment of the throws of the cam-lever and clutch. A stud $k$ projects from a downward extension of the head B² into the slot of the lever H.

On one side of the head B², above the opening therein, is hinged a spring abutment I, (shown in the form of a back $l$,) having a pair of claws $l'$ projecting from its lower edge across the vertical shaft B' by embracing it, with spiral springs $l^2$ pressing at their outer ends against the inner surface of the back, near its lower edge, and at their inner ends confined in recesses in the adjacent side of the lower solid portion of the head B², as indicated at $s$ in Fig. 5. The head B² is confined to slide between upright guides $m$, and has journaled in suitable bearings on its side opposite that carrying the abutment I a rock-shaft K, carrying, to extend at right angles from it, fingers $n\,n$, registering and engaging with the claws $l'$ on the abutment, and a crank $o$ on one end. In the path of the crank $o$ is provided an upright stationary guide L, having its lower end beveled to act as a cam-guide. A lever $l'$ is fulcrumed between its ends adjacent to the guide L to project at one end across the path of the crank at the upper end of said guide, the opposite end of the lever being held by a coiled spring $r$, fastened to a stationary object. (Not shown.)

M is a vertically-reciprocating catch (shown as a rectangular frame) embracing at its sides the guides $m$, on which it is confined to slide up and down, thereby also enveloping the head B² when brought coincident therewith, as hereinafter described, and from the lower edge of the back of the catch there projects a lip $p$ to engage with the abutment I at its base, also as and for the purpose hereinafter described. This catch is connected by a pitman N³ eccentrically with a wheel N' on a shaft N, journaled in suitable bearings on the bed C and carrying a belt-pulley N².

The operation is as follows: While the machine is at work the shaft N is constantly revolving to continually reciprocate the catch M, as is also the pulley E' to drive the shaft E when clutched thereto in the direction that will cause the gears D' and D to rotate the spiral tool B reversely, meaning in the direction of reversing an auger in withdrawing it from the work. Before starting the machine concrete to be molded is supplied to the open-bottomed pan $e$. The operator first shifts the lever G to retract the trigger B³ from supporting the head B², which upon being thus released drops by gravity with the shaft B' and weighted tool B, causing the latter to pass through the pan into the mold $a$ and reach therein to or nearly to its base. In dropping through the pan the tool forces ahead of it some of the material into the mold and compresses it against the base thereof. As the tool thus drops the stud $k$ by its engagement with the inclined slot in the upper angle of the lever H shifts the latter on its fulcrum in the direction to bring the lower slotted section of the lever into a vertical position and to cause the link H' so to throw the bearing C² as to ship the clutch member $g$ into engagement with its companion member. Thereupon the shaft B' and with it the tool B begin to rotate and continue so to do until the molding operation is completed, when the tool is automatically lifted suddenly, as hereinafter described, to its initial position to prepare it for another drop. While the tool is rotating in the mold the operator assists the supply into the latter of the material by moving it by hand in the pan toward the tool, which feeds it into the mold spirally and by the rotation thoroughly works it therein to more intimately mix the ingredients, with the advantage of enhancing the cohesiveness of the material, and accordingly the strength of the molded article. As the material accumulates in the mold its gradually-increasing height lifts the tool against the resistance of its weight exerted through it upon the material, and the lower end of the tool thus continually rotates and bears heavily upon the material in the mold and thoroughly compacts it therein. The parts of the mechanism are so arranged that during the rise of the spiral tool and its shaft B' the crank $o$ on the rock-shaft K bears against and travels along the edge adjacent to the shaft B' of the vertical guide L, thereby maintaining the rock-shaft in such a position as to avoid compression on the abutment-springs $l^2$ by engagement of the fingers $n$ on the rock-shaft with the claws of the abutment, whereby those springs are distended and hold the abutment out to project into the plane of the path of the lip $p$ on the reciprocating catch M. The arrangement is such, moreover, under the comparatively short play of the catch as to maintain out of its path, and therefore out of engagement with the lip, the lower protruding end of the abutment until the tool has been lifted by the material in the mold entirely out of the latter. Thereupon the catch in its upstroke engages at its lip $p$ with the base of the abutment and suddenly carries upward the head B², and with it the shaft B' and tool B, the head in its rise passing the trigger B³ to retract it against its controlling-spring, the recoil of which when the head has so passed forcing the trigger into the opening of the head to support the tool in its initial position until again released to drop for another molding operation. In the rise of the tool under the accumulation of material in the mold the stud $k$ rises in the slotted lever H to or nearly to the upper inclined section thereof, so that when the sudden lift takes place by the action of the catch in engaging the abutment the stud enters the slot in the upper inclined section of that lever and throws it in the direction to cause the link H' to unship the clutch E², thereby arresting the rotation of the shaft E, and consequently that of the tool. As the head B² in its sudden upward movement passes the trigger B³ the crank $o$ on the rock-shaft K encounters the end of the lever L' in its path, thereby turning it on its fulcrum and tensioning its controlling-spring $r$ until the crank reaches the upper end of the guide L, where the recoil of the spring bears the free end of the lever L' with sufficient force against the wrist-pin of the crank to ride it over the upper end of the guide and set it to bear against the edge thereof farthest removed from the shaft B'. In thus turning the crank to this position it turns the rock-shaft K accordingly to engage the fingers $n$ with the claws of the abutment I, thereby withdrawing the latter, against the resistance of its springs $l^2$, out of the path of the catch M and withholding it therefrom until in the next drop of the tool the crank clears the lower beveled end of the guide L, where the recoil force of the springs $l^2$ will ride the wrist-pin to the opposite side of the guide and project the abutment into position to be eventually engaged by the catch, as hereinbefore described.

As a modification the tool B may be formed hollow or tubular, as represented in Fig. 1ª, for operating in the mold to produce hollow articles, such as tile or pipe, and if it be desired to form a solid article being molded with a strengthening-core a metal rod $z$ may be loosely confined in the hollow tool to be introduced with it into the mold, wherein the material will retain it.

The somewhat intricate nature of the mechanism and operation of my improved apparatus has rendered necessary the foregoing minute description thereof. I do not, however, intend to be understood as meaning to imply that my invention is limited to the details of construction shown and described, as the mechanism may without departure from the invention be variously modified by those skilled in the art.

What I claim as new, and desire to secure by Letters Patent, is—

1. In combination with a mold for cement articles, compacting means for the material being molded, comprising a spiral tool alining with said mold on a vertical rotary shaft releasably supported to adapt it to be dropped to introduce the tool into the mold, and to be raised against gravity out of the same by the accumulation of the material in the mold, means for reversely rotating said tool in the mold, and automatically-operating means for lifting the shaft and tool thereon to the initial position on its releasable support after the tool has been so raised out of the mold.

2. In combination with a mold for cement articles, compacting means for the material being molded, comprising a spiral tool alining with said mold on a vertical rotary shaft releasably supported to adapt it to be dropped to introduce the tool into the mold and to be raised against gravity out of the same by the accumulation of material in the mold, a driving-shaft geared to said vertical shaft and carrying a clutch, a bent slotted lever having a stud connection with said vertical shaft and connected with said clutch to engage it with and disengage it from its shaft by the dropping of said vertical shaft and lifting the same after the tool has cleared the mold.

3. In combination with a mold for cement articles, compacting means for the material being molded, comprising a spiral tool alining with said mold on a vertical rotary longitudinally-movable shaft provided with a head, a spring-pressed trigger releasably engaging said head and provided with a lever for operating it, a driving-shaft geared to said vertical shaft and carrying a clutch, a bent slotted lever having a stud connection with said head and connected with said clutch to engage it with and disengage it from its shaft by the dropping of said vertical shaft and lifting the same after the tool has cleared the mold, a reciprocating catch with means for actuating it, a spring-controlled abutment on said head engaged by said catch to lift said vertical shaft into engagement of its head with said trigger, and means connected with said abutment for retaining it out of the path of said catch in the descent of said tool.

4. In combination with a mold for cement articles, compacting means for the material being molded, comprising a spiral tool alining with said mold on a vertical rotary longitudinally-movable shaft provided with a head, a spring-pressed trigger releasably engaging said head and provided with a lever for operating it, a driving-shaft geared to said vertical shaft and carrying a clutch, a bent slotted lever having a stud connection with said head and a link connection with said clutch to engage it with and disengage it from its shaft by the dropping of said vertical shaft and lifting the same after the tool has cleared the mold, a catch supported to reciprocate on vertical guides, a rotary shaft carrying a wheel having a pitman connection with said catch for actuating it, a spring-controlled abutment on said head engaged by said catch to lift said vertical shaft into engagement of its head with said trigger, and means connected with said abutment for retaining it out of the path of said catch in the descent of said tool.

5. In combination with a mold for cement articles, compacting means for the material being molded, comprising a spiral tool alining with said mold on a vertical rotary longitudinally-movable shaft provided with a head, a spring-pressed trigger releasably engaging said head and provided with a lever for operating it, a driving-shaft geared to said vertical shaft and carrying a clutch, a bent slotted lever having a stud connection with said head and a link connection with said clutch to engage it with and disengage it from its shaft by the dropping of said vertical shaft and lifting the same after the tool has cleared the mold, a catch supported to reciprocate on vertical guides and provided with means for actuating it, a spring-controlled abutment on said head, having claws, a rock-shaft journaled on said head having fingers to engage said claws and a crank on one end, a vertical guide for said crank having a beveled end, and a spring-controlled lever extending adjacent to the upper end of said vertical guide across the path of said crank.

LEO G. HAASE.

In presence of—
L. HEISLAR,
WALTER WINBERG.